Sept. 23, 1969  J. C. SCHULTZ  3,468,390
DIRECT DRIVE VEHICLE WHEEL MOUNT
Filed Aug. 29, 1967  3 Sheets-Sheet 1
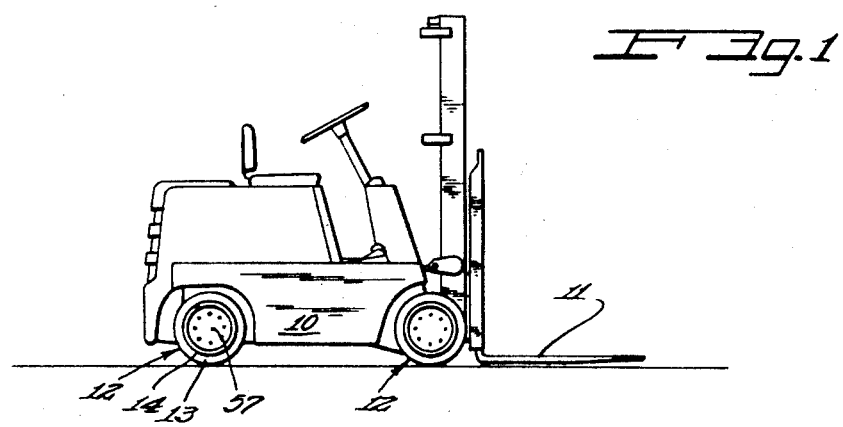
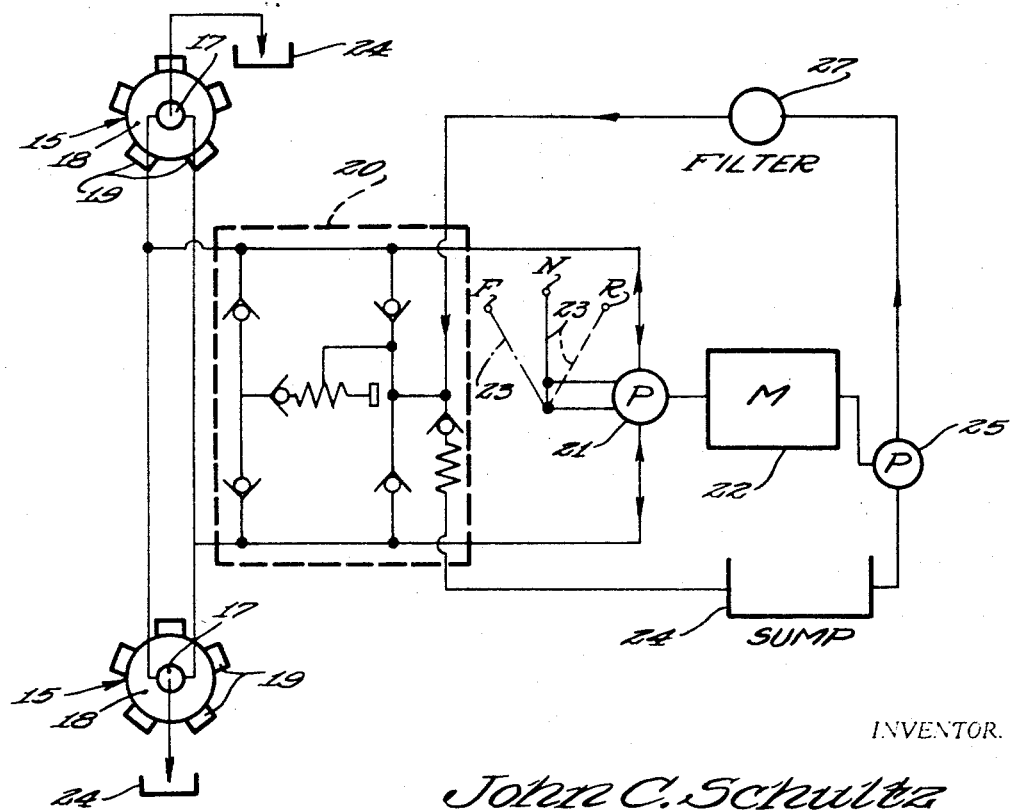
INVENTOR.
John C. Schultz
BY Hill, Sherman, Meroni, Gross & Simpson ATTORNEYS

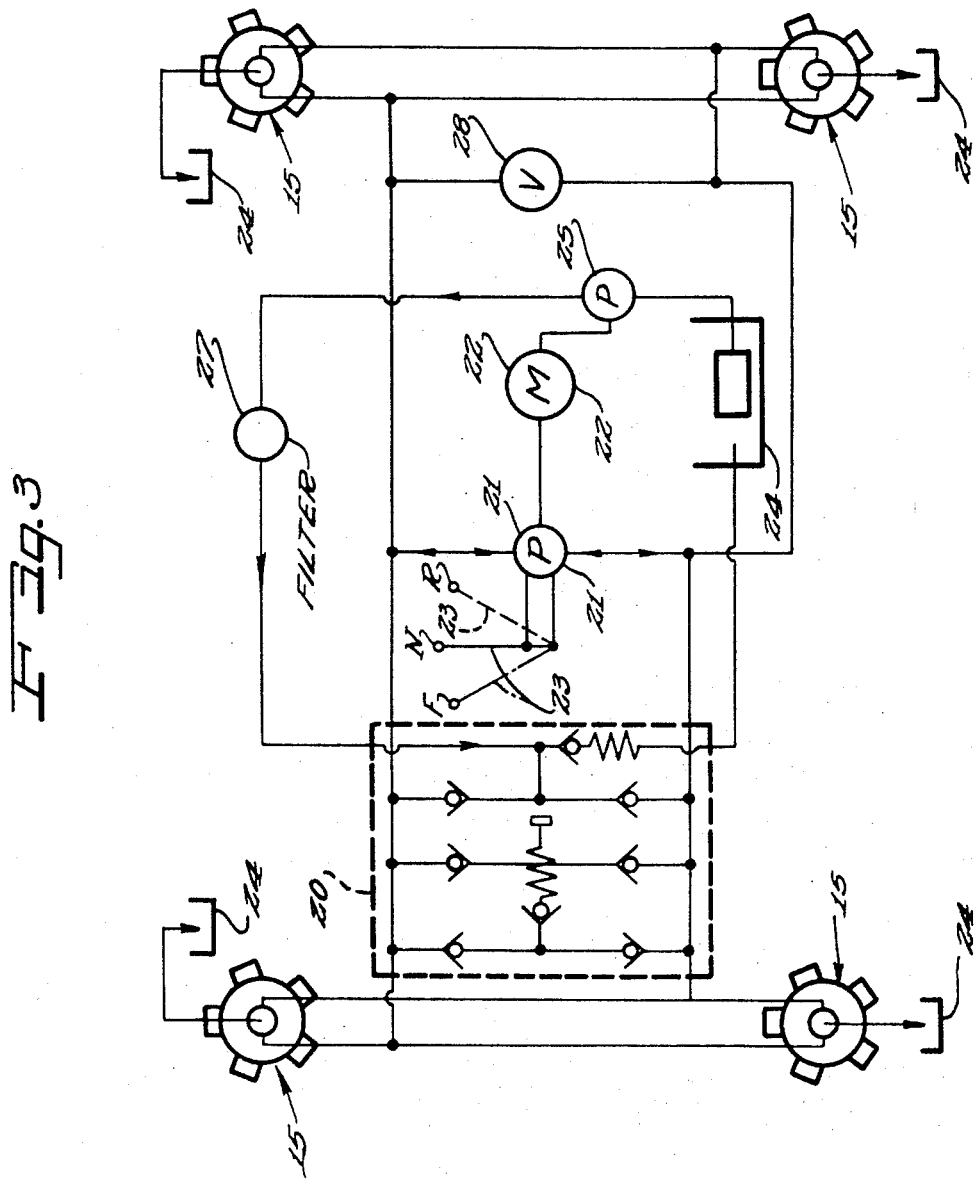

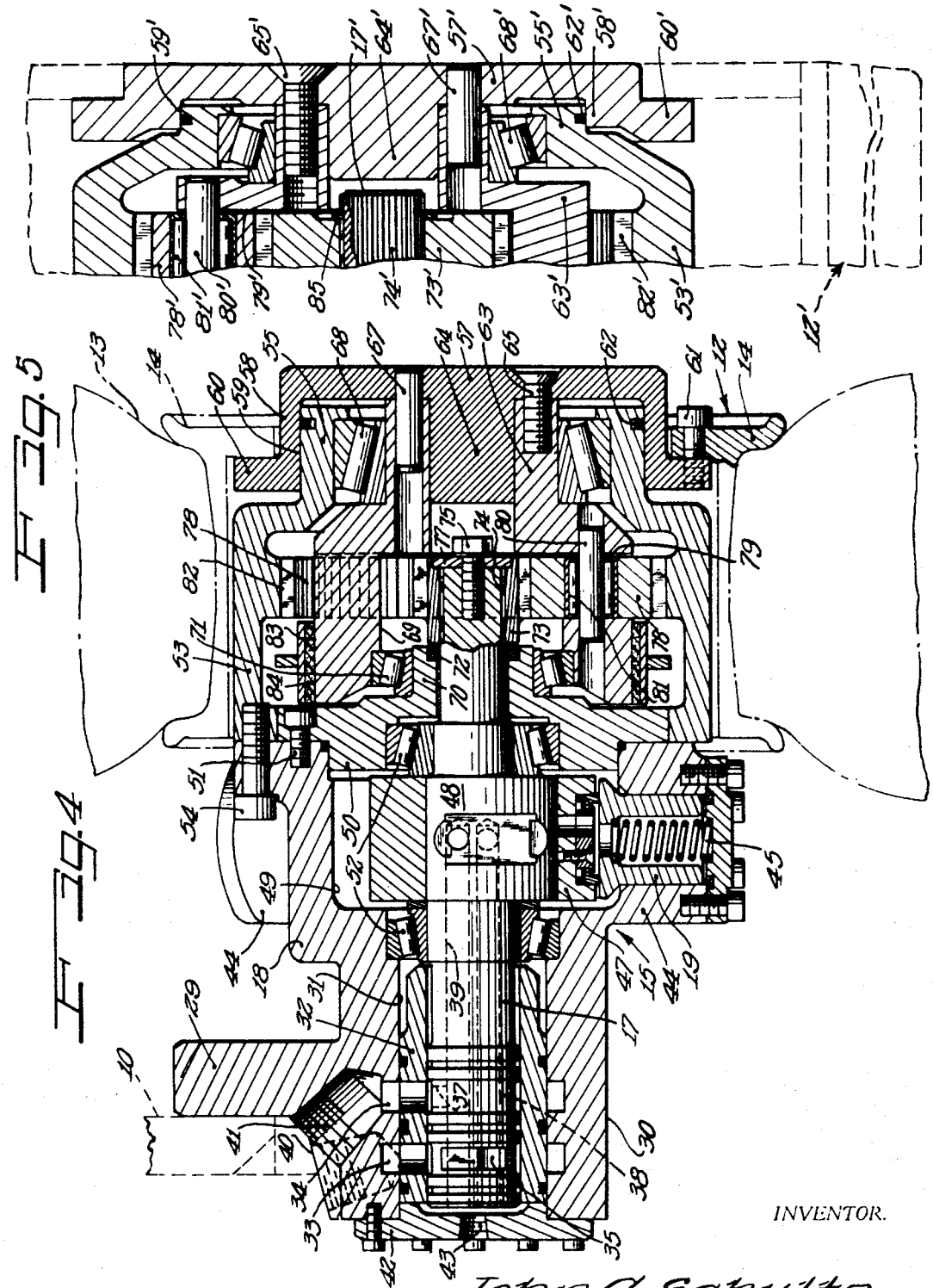

United States Patent Office

3,468,390
Patented Sept. 23, 1969

3,468,390
DIRECT DRIVE VEHICLE WHEEL MOUNT
John C. Schultz, Buffalo, N.Y., assignor to Houdaille Industries, Inc., Buffalo, N.Y., a corporation of Michigan
Filed Aug. 29, 1967, Ser. No. 664,140
Int. Cl. B60k 7/00, 3/00
U.S. Cl. 180—66                8 Claims

ABSTRACT OF THE DISCLOSURE

A hydraulic wheel drive operates in a wheel housing having therein a high torque, low speed, radial piston hydraulic motor the shaft of which is coupled through a planetary gearing with a rotary wheel support supported rotatably on the housing. A mechanical brake within the housing is operative on the rotary wheel support.

---

This invention relates to direct drive vehicle wheel mounts and more particularly concerns hydraulically driven wheels such as are especially useful for industrial lift trucks and the like.

Heretofore hydraulic motor driving of vehicle wheels has been through high speed hydraulic motor units with multi-stage gear reduction in order to achieve the required torque within the available space. Such arrangements have therefore generally employed a very small motor turning at extremely high speeds and resulting in insufficient hydraulic motor life in relation to the life of the vehicle.

It is, accordingly, an important object of the present invention to provide a hydraulic motor driven individual wheel mount arrangement which will provide adequate torque, speed of operation and braking capabilities within the confines of a wheel rim, and especially relatively small diameter wheel rims such as are employed on lift trucks.

Another object of the invention is to provide a new and improved hydraulic wheel drive which will provide a wide range of operating speeds and torque capability for running and load requirements of the vehicle to which applied.

A further object of the invention is to provide a new and improved hydraulic motor direct drive vehicle wheel mount which affords substantial advantages in ease of tread width adaptability.

Still another object of the invention is to provide a new and improved direct drive vehicle wheel mount of the character indicated which affords dynamic braking and eliminates the service brake requirements of prior constructions so that the only mechanical braking necessary is for emergency braking purposes.

Other objects, features and advantages of the present invention will be readily apparent from the following detailed description of certain preferred embodiments thereof taken in conjunction with the accompanying drawings in which:

FIGURE 1 is a side elevational view of a typical lift truck having wheels embodying features according to the principles of the present invention;

FIGURE 2 is a schematic view of a hydraulic system employing individual hydraulic motor drives for two wheels of the vehicle;

FIGURE 3 is an hydraulic schematic diagrammatic view showing the application of four wheel drive according to the invention;

FIGURE 4 is an enlarged longitudinal vertical sectional detail view through the wheel mount of one of the vehicle wheels; and FIGURE 5 is a similar sectional view showing a slight modification.

According to the features of the present invention a direct drive vehicle wheel mount has a hydraulic motor which comprises a shaft and a housing thereabout with means for relatively rotatably driving the shaft and housing. Means are provided for rotatably supporting a wheel coaxially about at least a portion of the housing, and means are operative in the relative rotation of the shaft and the housing to transmit driving power from the motor to drive the wheel supporting means and the wheel rotatably relative to the shaft and the housing.

By way of example of a practical use of directly driven wheels according to the present invention, a vehicle 10 is shown in FIGURE 1 which comprises a fork lift truck having on the front thereof a load lifting fork 11. Mobile support for the vehicle 10 is by means of wheels 12 having tires 13 mounted on rims 14. Propulsion of vehicles of this type is generally by means of electric motors carried thereby, and sometimes by means of internal combustion motors which have heretofore generally been mounted on the vehicle body or carriage and drivingly connected with the wheels, or some of them, by transmission means such as gearing, chains, and the like.

According to the present invention, some, or all, of the wheels 12 are directly driven by means of respective hydraulic motors 15 (FIGS. 2, 3 and 4). Each of the motors comprises a shaft 17 having a housing 18 thereabout and means comprising radial hydraulically actuated pistons 19 relatively rotatably driving the shaft and housing. In the schematic of FIGURE 2 a hydraulic system for operating two driven wheels of the vehicle is shown wherein both of the individual driving motors 15 of the wheels are hydraulically connected through a relief and check valve assembly with a hydraulic pump 21 driven by a motor 22 and having a control device 23 to effect a forward driving, a reverse driving and a neutral setting for the pump. Spent fluid and leakage drain-off from the motors 15 returns to a sump 24 with which is connected a pump 25, also driven by the motor 22, which circulates the hydraulic fluid through a filter 27 and supplies it to the wheel motor driving system, as shown. In a four wheel drive as shown in FIGURE 3, substantially the same hydraulic motor driving system is provided for the motors 15 for all of the wheels of the vehicle, and in addition a valve 28 is provided in the system which is opened when the vehicle is to be towed with the hydraulic fluid pressurizing motor 22 shut down.

In the present instance the construction and relationship are such that the wheel loads are taken through the motor housing 18 of the driven wheel in each instance, thus relieving the shaft 17 of all loads other than those imposed by the driving torques generated. Further, the motor housing is so constructed and arranged that it provides a closed unit within which the operating parts are thoroughly protected against dirt, dust or other foreign materials normally encountered in operation of the associated vehicle. To this end, the housing 18 has an inner end portion provided with attachment means such as a rugged flange 29 by which the housing is fixedly but removably attached to the frame of the vehicle 10. This rear end portion of the housing serves as a hub 30 within which is a bore 31 having therein a sleeve 32 within which an inward extension of the shaft 17 is rotatably received and which has axially spaced ports 33 and 34 connecting corresponding fluid delivery ports 35 and 37, respectively, in the shaft connecting with respective longitudinally extending passages 38 and 39 in the shaft and which conduct hydraulic fluid to and from the hydraulic pistons 19 in the manner more particularly described in Kimsey Patent 3,036,557. Connection of the ports 33 and 34 with the hydraulic system is through respective ports 40 and 41 in the housing 18. At its rear end the bore 31 is closed by a closure 42 which has a drain-off port 43 therein normally connected to the sump of the hydraulic system.

In accordance with the teachings of the Kimsey patent, there are five of the pistons 19, each radially reciprocably mounted in a cylinder 44, in this instance integral with the housing 18. The pistons 19 are thrust by respective springs 45 toward a respective face of a pentagonal bearing block 47 within which an eccentric 48 on the shaft 17 is operative, within a working chamber 49 provided therefor in the housing 18. On its outer end the chamber 49 is initially open for ready assembly of the shaft and the motor components in the housing, and in the completed assembly is closed by a hub flange 50 partially telescoped with the housing and attached as by means of screws 51. Adjacent to each end of the motor chamber 49, the shaft 17 is journalled in balanced relation in respective roller bearings 52.

Operation of the motor 15 to drive the shaft 17 rotatably in the housing 18 drives the wheel 12 which is herein rotatably supported coaxially about at least a portion of the housing. To this end, the housing 18 has an axially outwardly projecting portion 53 which, for assembly convenience is formed separately from the main, vehicle attached portion of the housing and in the form of a hollow shell secured as by means of screws 54 to an outer end face of the housing body and concentrically about the attachment flange of the hub 50. In length and diameter, the outward housing extension 53 is such as to be received within the rim 14 of the wheel 12, with a reduced diameter outer end annular hub flange 55 for relatively rotatably supporting means for rotatably supporting the wheel and comprising a combination wheel body and housing end closure member 57. For removable attachment of the tire rim 12 thereto, the wheel body member 57 has an axially inwardly extending flange 58 which extends in freely rotatable closely encompassing relation about a radially outwardly facing cylindrical surface 59 on the housing flange 55 and has a radially outwardly inner end attachment lug flange structure 60 to which the rim 14 is detachably secured as by means of bolts or screws 61. This arrangement permits the use of single or dual wheels and in which a dual wheel will have the second tire rim attached to the same lug flange structure 60. A combination dust and leakage preventing seal 62 is mounted in the joint between the flange 58 and the hub surface 59.

Mounting of the wheel body 57 rotatably relative to the housing and coaxially with the motor shaft 17 comprise a journal member 63 having an axially outwardly opening bore coaxially aligned with the outer end of the outwardly projecting portion of the shaft 17 and within which is engaged a complementary inwardly projecting axial mounting boss 64 of the wheel body. Means such as screws 65 and dowels 67 secure the wheel body 57 fixedly, but removably to the journal member 63.

Within the housing portion 53, the journal member 63 is freely rotatably mounted in such relation that wheel loads are efficiently carried by the motor housing. For this purpose, an annular roller bearing assembly 68 rotatably mounts the outer end portion of the journal member within the housing flange 55. The inner end portion of the journal member has a counterbore 69 into which projects a smaller diameter outer end hub flange 70 on the end closure and hub member 50 and carrying an annular roller bearing assembly 71 mounting the inner end portion of the journal member. An annular dynamic seal 72 mounted in the flange 70 engages about the outwardly projecting shaft portion to prevent leakage thereby from within the motor chamber.

Means operative in the relative rotation of the shaft 17 and the housing 18 to transmit driving power from the motor to drive the journal 63 and thereby the wheel 12 rotatably relative to the shaft and the housing comprise a transmission desirably in the form of a planetary gear assembly including a sun gear 73 keyed as by means of splines 74 corotatably on the outer end portion of the shaft 17 and retained thereon removably as by means of a bolt 75 and a retaining disk 77. Meshing with the sun gear 73 is a set of planet gears 78 carried by the journal member 63 serving as a combination planet carrier and wheel axle or journal. In the arrangement shown five of the planet gears 78 are mounted in freely rotatable relation in respective radial slots 79 opening through the outer perimeter of the journal member and into the counterbore 69 with axle pins 80 across the slots journalling the respective planet gears equipped with anti-friction needle or roller bearings 81 for this purpose. While within the counterbore 69 the planet gears 78 mesh operatively with the sun gear 73, beyond the outer perimeter of the journal 63, the planet gears mesh operatively with a stationary ring gear 82 desirably comprising a fixed, integral part of the inner wall or perimeter of the housing member 53. It will be observed that a thoroughly balanced power transmission relationship between the planetary transmission and the journal 63 is attained by distribution of the wheel loads to the motor housing on both sides of the gear train plane. A positive, smooth, high torque desirable gear ratio driving of the wheel 12 is attained in the operation of the motor 15.

While the hydraulic motor operating system is adapted to be utilized during maintenance of hydraulic pressure for braking the respective motor driven wheels 12, and thus need for dynamic mechanical braking means may be eliminated, mechanical emergency brake means are desirably provided. In the present instance this can be effected entirely within the motor housing, and more particularly within the housing portion 53 and about an inner end portion cylindrical outer peripheral surface 83 on the journal member 63 and serving as a brake drum. Engageable in braking relation with the drum surface 83 is a mechanical friction brake 84 which is adapted to be operated in any desirable fashion or as is customary for this type of brake.

In the modification of FIGURE 5 an arrangement is shown which is adapted for relatively narrower tread wheels 12' and possibly lighter wheel loads and in which the housing and wheel supporting and body portions are more compactly constructed in view of the lesser operating requirements, although in other respects the hydraulic motor and housing and the manner in which attached to the vehicle may be substantially the same as disclosed in respect to FIGURE 4. Accordingly, the housing 53' has a substantially shorter outer hub end portion 55' in relation to which the combination closure and wheel body 57' is mounted with a correspondingly shorter radially outer axial wheel mounting flange 58' about the hub perimeter 59' and having the wheel attachment lug structure 60'. A seal 62' carried by the hub flange 55' seals the joint between the flange 58' and the surface 59'. The journal member 63' has within its axial outwardly opening bore the complementary central wheel body boss 64' and the screws 65' and dowels 67' removably attach the wheel to the journal member. In this instance, the sun gear 73' which is keyed to the end portion of the shaft 17' by the splines 74' is held on the shaft by means of a snap ring 83 and meshes with the planet gears 78' mounted in the slot 79' in the journal member by means of axle pins 80' and anti-friction bearings 81'. The planet gears mesh operatively with a stationary ring gear on the housing 53'. Operation of the structure is the same as described in respect to FIGURE 4.

It will be understood that variations and modifications may be effected without departing from the spirit and scope of the novel concepts of this invention.

I claim as my invention:

1. In a direct drive vehicle wheel mount:
   a hydraulic motor comprising a shaft and a housing thereabout with means for relatively rotatably driving the shaft and housing;
   a journal member for rotatably supporting a wheel including a body member and means for detachably securing the body member to the journal member;
   means rotatably mounting the journal member within the housing; and
   means operative in the relative rotation of the shaft and the housing to transmit driving power from the motor to drive said journal member and thereby the wheel rotatably relative to the shaft and the housing comprising a planetary gear assembly including a sun gear on said shaft, planet gears mounted on the journal member and operatively meshing with the sun gear, and a ring gear stationary on the housing and operatively meshing with the planet gears.

2. A mount as defined in claim 1, including a brake drum portion on said journal member, and a mechanical brake operatively engaged with said brake drum portion.

3. A mount as defined in claim 1, including antifriction bearings mounting the journal member in said housing on opposite sides of a plane through the planetary gearing.

4. In a direct drive vehicle wheel mount:
   a hydraulic motor comprising a shaft and a housing thereabout with means for relatively rotably driving the shaft and housing;
   said housing having a motor chamber initially open at one end;
   a hub member secured in closing relation to said open end of the chamber;
   a housing extension attached to the housing about said hub member and providing a chamber therein and an outer end hub portion;
   a journal member for rotatably supporting a wheel coaxially about at least a portion of the housing;
   bearings journalling said journal member in balanced relation on said hub member and on said hub portion of said housing extension; and
   means comprising gearing operatively connecting said shaft with said journal member and operative in the relative rotation of the shaft and the housing to transmit driving power from the motor to drive said journal member and the wheel rotatably relative to said shaft and said housing.

5. A mount as defined in claim 4, including a combination wheel body and end closure mounted in closing relation to said housing extension chamber, and means operatively securing said wheel body to said journal member.

6. A wheel mount according to claim 4, said gearing comprising a sun gear on said shaft, planet gears mounted on said journal member and operatively meshing with said sun gear, and a ring gear stationary on said housing extension.

7. A wheel mount according to claim 4, comprising a brake drum portion on said journal member, and a mechanical brake operatively engageable with said brake drum portion.

8. In a vehicle having a body including a frame and running gear comprising wheels supporting the body:
   at least certain of said wheels being driven and having direct drive mounts each including a hydraulic motor comprising a shaft and a housing thereabout fixedly attached to said frame, with hydraulically actuated means in the housing acting on and between the shaft and the housing for relatively rotatably driving the shaft and housing;
   a hydraulic circuit operatively connected with the hydraulic motors and including a motor which drives a pump, and circuit controlling means;
   each of said driven wheels having a journal rotatably mounted within its drive mount housing; and
   means operative in the relative rotation of each of the shafts and the housing with which associated to transmit driving power from the respective motor to drive the respective journal and its wheel rotatably relative to the respective housing and relative to the respective shaft.

References Cited

UNITED STATES PATENTS

| | | | |
|---|---|---|---|
| 2,355,604 | 8/1944 | Rupp | 180—66 |
| 3,036,557 | 5/1962 | Kimsey | 91—176 |
| 3,154,164 | 10/1964 | Shaw et al. | 180—66 X |
| 3,154,165 | 10/1964 | Herrmann et al. | 180—66 |
| 3,217,826 | 11/1965 | Carter et al. | 180—66 X |
| 3,302,741 | 2/1967 | Brazuk | 180—66 X |

FOREIGN PATENTS 481,093  3/1938  Great Britain.

BENJAMIN HERSH, Primary Examiner

MILTON L. SMITH, Assistant Examiner

PO-1050
(5/69)

UNITED STATES PATENT OFFICE
CERTIFICATE OF CORRECTION

Patent No. 3,468,390                    Dated    September 23, 1969

Inventor(s)     JOHN C. SCHULTZ

It is certified that error appears in the above-identified patent and that said Letters Patent are hereby corrected as shown below:

Column 1, line 4, change "Michigan" to --Delaware--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents